April 13, 1943.  R. H. LOOTENS  2,316,442
BLACKOUT WINDOW
Filed Feb. 2, 1942
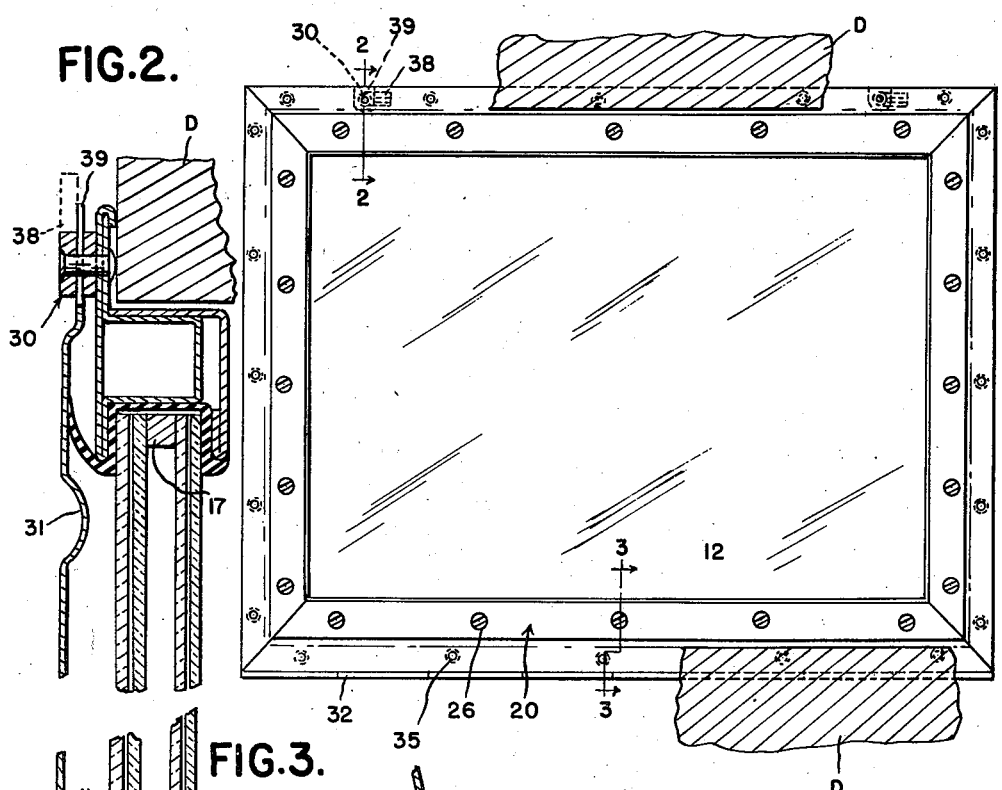
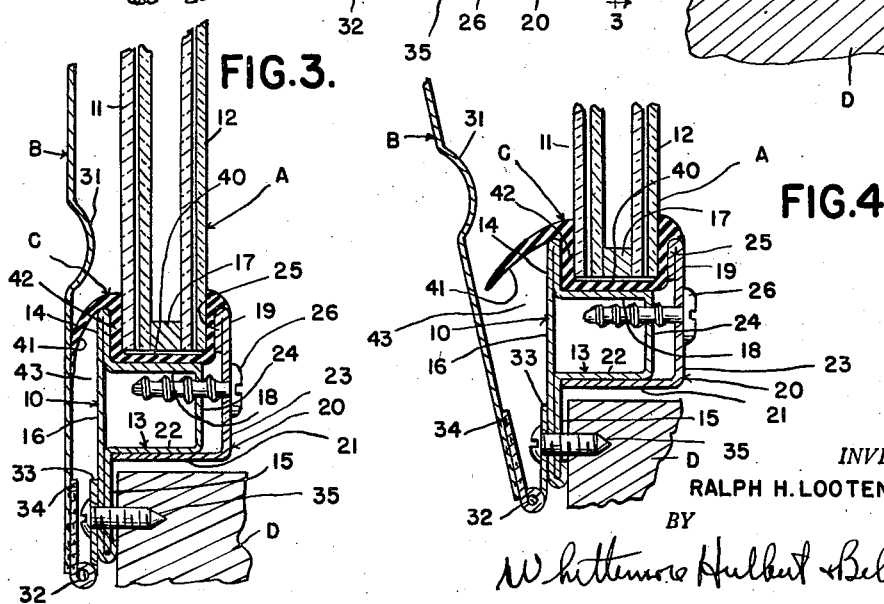
INVENTOR.
RALPH H. LOOTENS
BY
Whittemore Hulbert & Belknap
ATTORNEYS Patented Apr. 13, 1943

2,316,442

UNITED STATES PATENT OFFICE 2,316,442

BLACK-OUT WINDOW

Ralph H. Lootens, Detroit, Mich., assignor to Motor Products Corporation, Detroit, Mich., a corporation of New York Application February 2, 1942, Serial No. 429,318

7 Claims. (Cl. 189—64)

This invention relates generally to window shades or blinds and refers more particularly to a black-out window assembly.

Heretofore, shades and blinds of various kinds have been used with windows to obscure the vision from the outside of light and objects within a house, building, vehicle, and the like, but, in so far as I am aware, none of the devices employed in the past have been sufficient to completely prevent light and objects within the building from being observed from the outside thereof, especially at the edges of the window where such shades usually terminated. Ordinarily, streaks of light emerged from the window at the edges of the shades and were visible for comparatively long distances, hence such light provided definite targets for bombs from enemy aircraft.

In the present instance, I have overcome the difficulties and hazards of the conventional devices by the provision of a positive black-out window assembly which precludes absolutely any light or object within a building being visible from the outside thereof.

It is also an object of the present invention to provide a black-out window assembly that is simple in construction, inexpensive to manufacture, easy to install, and capable of being used with almost any window structure.

Other objects, advantages and novel details of construction of this invention will be made more apparent as this description proceeds, especially when considered in connection with the accompanying drawing, wherein:

Figure 1 is an elevational view of the inner side of the black-out window assembly embodying my invention, and showing in section portions of the supporting framework D;

Figure 2 is a sectional view taken on the line 2—2 of Figure 1;

Figure 3 is a sectional view taken substantially on the line 3—3 of Figure 1; and Figure 4 is a sectional view similar to Figure 3, but showing the black-out panel in partially open position.

Referring now to the drawing, A is a window structure, B is a black-out panel, and C is a cooperating sealing strip of a black-out window assembly embodying my invention.

As shown, the window structure A comprises a frame 10 and spaced panes 11 and 12, respectively, of laminated glass. Such frame 10 may be any suitable construction and may be formed from any suitable material. Likewise, the panes 11 and 12 of laminated glass may be any suitable construction and may be formed of any suitable material. In fact, the frame 10 may be constructed to receive only a single pane of glass instead of the spaced panes 11 and 12. Moreover, the glass used could be thick enough and strong enough to be bullet-proof if this is desired.

Preferably the frame 10 is formed of sheet metal and has an outwardly opening channel portion 13 provided at its outer side edges with laterally extending flange portions 14 and 15, respectively, and an overlapping garnish portion 16. The channel portion 13 may be received within a window opening in a building, house, vehicle, or the like, while the lateral flange 15 may overlap the edges of such opening and be secured to the adjacent framework D of the building. The garnish portion 16 is disposed in surface-to-surface relation upon the outer faces of the lateral flanges 14 and 15 and constitutes a closure for the outwardly opening channel 13. Preferably this garnish portion 16 is a closely return-bent part of the metal forming the flange 14 of the channel and is bent closely around the outer edges of the other flange 15.

The spaced panes 11 and 12 of glass are separated by a suitable spacer 17 and have their edges received within a channel 18 formed by the lateral flange 14 of the frame 10 and by an edgewise extension 19 of a clamping or retainer frame 20. Preferably one side 21 of this retainer frame is disposed in surface-to-surface relation with the outer side wall 22 of the channel portion 13, while the other side 23 of said retainer frame is disposed at substantially right angles to the first mentioned side 22 and is spaced from and substantially parallel to the base 24 of the outwardly opening channel 13. The extension 19 projecting edgewise from the last mentioned side 23 of the retainer frame is preferably substantially equal in width to the width of the lateral flange 14 of the frame 10 and has a closely return-bent flange 25 on the inner side thereof. Any suitable means, such as the screws 26, may be used to fasten the retainer frame 20 to the frame 10. Preferably they are self-tapping screws that extend through the side 23 of the retainer frame and the base 24 of the channel portion 13 of the frame 10.

The black-out panel B is upon the outer side of and substantially parallel to the frame 10 and has an area substantially equal to the outside area of said frame. Such panel may be formed of any suitable opaque material, but is preferably formed of sheet metal. In the present instance, this panel B is hingedly connected to the frame 10 and is held in closed position by suitable fasteners 30. If desired, the panel B may be provided with one or more embossed portions 31 to stiffen and strengthen the same.

As shown, the hinge 32 employed to connect the black-out panel B to the frame 10 is conventional in design and has one section 33 thereof secured in surface-to-surface relation to the outer side of the garnish portion 16 of the frame 10 at the lower edge of the latter and has its other section 34 secured in surface-to-surface relation to the inner side of the panel B at its lower edge. Preferably some of the screws 35 employed to secure the lateral flange 15 of the frame 10 to the framework D of the building are employed to secure the hinge section 33 to the garnish portion 16 of the frame 10. The other section 34 of the hinge is preferably welded to the panel B. Obviously, any number of hinges, such as 32, may be employed, as described, at the lower edges of the black-out panel B and frame 10. Moreover, such hinges may be at any edge desired of the frame 10 and panel B.

The fasteners 30 for the panel B are preferably in the form of elongated fingerpieces pivoted at one end to the frame 10 and having arms 38 adapted to swing about said pivots from registering slots 39 in the panel onto the outer surface of the panel to retain it in place. Obviously, any suitable fasteners may be used for this purpose.

The sealing strip C is preferably formed of resilient material and has a channel-shaped portion 40 and a laterally extending lip portion 41. The channel portion 40 is clamped within the channel 18 formed by the relatively movable frames 10 and 20, respectively, and receives and forms a cushion for the edges of the glass panes 11 and 12, while the lateral lip portion 41 projects from and constitutes an extension of the outer side wall 42 of the channel portion 40 of the strip. Actually this lip portion 41 constitutes an open return-bent part of the outer side wall 42 of said channel and engages in surface-to-surface relation the inner side of the black-out panel B when the latter is in closed position. Thus, the space 43 between the garnish portion 16 of the window frame 10 and the black-out panel B is effectively closed and sealed so no light whatever can escape to or be visible from the outside of the window. The cooperation of the sealing strip C with the black-out panel B is complete in this respect and insures a definite and positive black-out structure for any window upon which it is mounted.

What I claim as my invention is:

1. A black-out window assembly comprising a window frame having an outwardly opening channel portion provided at opposite outer edges thereof with lateral flanges, and a garnish portion upon said lateral flanges and constituting a closure for said channel portion, an opaque panel substantially parallel to the garnish portion of said window frame, a support for said opaque panel carried by one of said lateral flanges, and a resilient cushion for one or more transparent panes within said frame having a lip extending laterally beyond the other of said lateral flanges and disposed in surface-to-surface relation with said opaque panel.

2. A black-out window assembly comprising a window frame having an outwardly opening channel portion provided at opposite outer edges thereof with lateral flanges, and a garnish portion disposed in surface-to-surface relation to the lateral flanges and constituting a closure for said channel portion, a retainer frame mounted on the channel portion of said window frame and having a portion cooperating with one side of the channel portion and one lateral flange aforesaid of the window frame to provide an inwardly opening channel for the reception of one or more panes of glass, a resilient cushion for the glass panes within said inwardly opening channel having a lateral lip extending over the garnish portion of said window frame, an opaque panel substantially parallel to the garnish portion of said window frame and disposed in surface-to-surface relation with said lip, a hinge for the opaque panel, and means securing the hinge to the garnish portion and other lateral flange of said window frame and adapted to secure the latter to a suitable support.

3. A black-out window assembly comprising a window frame having an outwardly opening channel portion provided at opposite outer edges thereof with lateral flanges, and a garnish portion disposed in surface-to-surface relation to the lateral flanges and constituting a closure for said channel portion, a retainer frame mounted on the channel portion of said window frame and having a portion cooperating with one side of the channel portion and one lateral flange aforesaid of the window frame to provide an inwardly opening channel for the reception of one or more panes of glass, a resilient cushion for the glass panes within said inwardly opening channel having a lateral lip extending over the garnish portion of said window frame, and an opaque panel mounted upon the garnish portion of said window frame and disposed in surface-to-surface relation with said lip.

4. A black-out window assembly comprising a main frame and an auxiliary frame secured together and having portions cooperating with each other to form a channel for receiving the edges of one or more glass panes, and means for positively precluding any light upon the inner side of said panes being visible from the outside thereof, including a black-out panel of opaque material mounted upon one of the frames aforesaid, and a strip of resilient material having a channel shaped portion anchored in said channel and forming a cushion for the edges of the panes and having a web-like portion projecting laterally from the channel shaped portion and bearing against the adjacent surface of the black-out panel and sealing the space between said panel and channel.

5. A black-out window assembly comprising a main frame and an auxiliary frame secured together and having portions cooperating with each other to form a channel for receiving the edges of one or more glass panes, and means for positively precluding any light upon the inner side of said panes being visible from the outside thereof, including an imperforate sheet of metal mounted upon and equal in area to one of the frames aforesaid, and a strip of resilient material having a portion anchored in said channel and forming a cushion for the edges of the panes and having another portion bearing against the adjacent surface of the metal sheet and sealing the space between said metal sheet and channel.

6. A black-out window assembly comprising a main frame and an auxiliary frame secured together and having portions cooperating with each other to form a channel for receiving the edges of one or more glass panes, and means for positively precluding any light upon the inner side of said panes being visible from the outside thereof, including an imperforate sheet of metal mounted upon and equal in area to one of the frames aforesaid, and a strip of resilient material having a portion secured to said channel and having another portion bearing against the adjacent surface of the metal sheet and sealing the space between said metal sheet and channel.

7. In a black-out window assembly, the combination with a window frame containing a transparent pane of glass, of means for positively preventing any light upon the inner side of the window frame being visible upon the outer side thereof including an opaque solid black-out panel mounted upon the outside of the frame so as to overlie the margins thereof, and a sealing strip carried by the window frame within the margins thereof and bearing firmly against the inner surface of the black-out panel.

RALPH H. LOOTENS.